(12) United States Patent
Kishima (10) Patent No.: US 9,926,020 B2
(45) Date of Patent: Mar. 27, 2018

(54) VEHICLE FRONT PORTION STRUCTURE (71) Applicant: TOYOTA JIDOSHA KABUSHIKI KAISHA, Toyota-shi, Aichi-ken (JP)

(72) Inventor: Fumihiko Kishima, Kounan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/308,392

(22) PCT Filed: Apr. 14, 2015

(86) PCT No.: PCT/JP2015/061511
§ 371 (c)(1),
(2) Date: Nov. 2, 2016

(87) PCT Pub. No.: WO2015/198693
PCT Pub. Date: Dec. 30, 2015

(65) Prior Publication Data
US 2017/0101135 A1    Apr. 13, 2017

(30) Foreign Application Priority Data
Jun. 25, 2014 (JP) ................. 2014-130217

(51) Int. Cl.
*B60J 9/00* (2006.01)
*B62D 35/00* (2006.01)
(Continued)

(52) U.S. Cl.
CPC .......... *B62D 35/005* (2013.01); *B62D 25/082* (2013.01); *B62D 25/16* (2013.01); *B62D 35/02* (2013.01); *Y02T 10/88* (2013.01)

(58) Field of Classification Search
CPC ....... B60Q 1/38; B60V 3/04; E05Y 2900/531; B60G 11/27; B60G 21/08; B60P 3/08;
(Continued)

(56) References Cited

U.S. PATENT DOCUMENTS 8,474,557 B2 * 7/2013 Wolf .................. B60T 5/00
180/68.1
9,669,807 B2 * 6/2017 Wolf .................. B60T 5/00
(Continued)

FOREIGN PATENT DOCUMENTS

JP    S58-44273 U    3/1983
JP    S63-194028 U   12/1988
(Continued)

*Primary Examiner* — Kiran B Patel
(74) *Attorney, Agent, or Firm* — Oliff PLC (57) ABSTRACT

A vehicle front portion structure, first guides are formed in a lower inner wall portion that configures part of a wheel well, and are inclined outward in a vehicle width direction and in a vehicle rearward direction as seen in a plan view. Furthermore, first open portions that open toward the vehicle rearward direction are formed in rear end portions of the first guides. For this reason, airflows flow along vehicle width direction inner surfaces of the first guides such that the airflows are altered to flows in the vehicle rearward direction. Because of this, inside the wheel well the airflows flow in the vehicle rearward direction from the first open portions, so the airflows are restrained from being blown outward in the vehicle width direction from the wheel well resulting in the occurrence of air turbulence at due to the airflows rushing out from the wheel well is controlled.

4 Claims, 8 Drawing Sheets (51) Int. Cl.
*B62D 25/16* (2006.01)
*B62D 35/02* (2006.01)
*B62D 25/08* (2006.01)

(58) Field of Classification Search
CPC ....... G07B 15/063; B62D 1/28; G01S 13/931; G01C 21/28
See application file for complete search history.

(56) References Cited

U.S. PATENT DOCUMENTS

| | | | |
|---|---|---|---|
| 9,669,885 B1* | 6/2017 | Fahland | B62D 37/02 |
| 2003/0160472 A1* | 8/2003 | Xia | B60K 13/02 |
| | | | 296/65.09 |
| 2007/0023238 A1* | 2/2007 | Ramsay | B60T 5/00 |
| | | | 188/71.6 |
| 2012/0318476 A1* | 12/2012 | Begleiter | B60T 5/00 |
| | | | 165/51 |
| 2015/0329151 A1* | 11/2015 | Kishima | B62D 35/02 |
| | | | 296/180.1 |
| 2015/0345578 A1* | 12/2015 | Nightingale | B60K 11/085 |
| | | | 188/264 AA |
| 2017/0232820 A1* | 8/2017 | Mitch | B60H 1/28 |
| | | | 454/147 |

FOREIGN PATENT DOCUMENTS

| | | |
|---|---|---|
| JP | S64-22684 U | 2/1989 |
| JP | H03-67278 U | 7/1991 |
| JP | H07-156666 A | 6/1995 |
| JP | 2007-001419 A | 1/2007 |
| JP | 2012-236570 A | 12/2012 |

* cited by examiner

VEHICLE FRONT PORTION STRUCTURE

TECHNICAL FIELD

The present invention relates to a vehicle front portion structure.

BACKGROUND ART

In a vehicle front portion structure disclosed in JP-A No. H7-156666 listed below, an under cover is disposed in a front portion of a vehicle, and the under cover covers a front lower portion of the vehicle body. A cooling duct, a strake, and an air outlet are disposed at the under cover, and traveling wind is guided by the cooling duct, the strake, and the air outlet to a brake mechanism unit to cool the brake mechanism unit.

CITATION LIST

Patent Document 1: JP-A No. H7-156666
Patent Document 2: JP-U No. S58-44273

SUMMARY OF INVENTION

Technical Problem

In this connection, when airflows rushing out from the engine compartment toward the front tires in the wheel wells are produced when the vehicle travels, there is the potential for the airflows to be blown outward in the vehicle width direction from the wheel wells. In this case, there is the concern that the airflows will collide with traveling wind flowing along the sides of the vehicle in the vehicle rearward direction and produce turbulence on the sides of the vehicle.

In consideration of the circumstance described above, it is an object of the present invention to provide a vehicle front portion structure that can control the occurrence of air turbulence on the sides of a vehicle.

Solution to Object

A vehicle front portion structure pertaining to a first aspect includes: an inner wall that configures part of a wheel well having a front wheel placed therein, the inner wall is placed at a vehicle width direction inner side of the front wheel, and the inner wall is formed with an open portion that is configured to communicate an inside of an engine compartment with an inside of the wheel well; and a guide that is formed at the inner wall and the guide guides, in a vehicle rearward direction, an airflow that is discharged from the open portion to the wheel well or an airflow that has been discharged from the open portion to the wheel well.

In the vehicle front portion structure pertaining to the first aspect, the inner wall that configures part of the wheel well having the front wheel placed therein is placed at the vehicle width direction inner side of the front wheel. The open portion is formed at the inner wall, and the inside of the engine compartment and the inside of the wheel well are communicated with each other by the open portion.

The guide is formed at the inner wall, and the guide guides, in the vehicle rearward direction, the airflow that is discharged from the open portion to the wheel well or the airflow that has been discharged from the open portion to the wheel well. That is, the airflow is guided in the vehicle rearward direction by the guide and is discharged from the open portion to the wheel well. Or, the airflow that has been discharged from the open portion to the wheel well is guided in the vehicle rearward direction by the guide. Because of this, inside the wheel well, the airflow flows in the vehicle rearward direction, so the airflow is restrained from rushing outward in the vehicle width direction from the wheel well. As a result, the airflow is restrained from colliding with traveling wind flowing along a side of the vehicle in the vehicle rearward direction. Consequently, the occurrence of air turbulence due to the airflow, that has been discharged from the open portion to the wheel well, rushing out from the wheel well can be controlled.

A vehicle front portion structure pertaining to a second aspect includes the first aspect, and furthermore, the guide is inclined outward in the vehicle width direction and in the vehicle rearward direction as seen in a plan view, and the open portion opens toward the vehicle rearward direction at a rear end portion of the guide.

In the vehicle front portion structure pertaining to the second aspect, the guide is inclined outward in the vehicle width direction and in the vehicle rearward direction as seen in a plan view, and the open portion opens toward the vehicle rearward direction at the rear end portion of the guide. Because of this, the airflow before being discharged from the open portion to the wheel well flows along a vehicle width direction inner surface of the guide, so the airflow can be altered to a flow in the vehicle rearward direction. Additionally, the airflow that has been altered to a flow in the vehicle rearward direction is discharged toward the vehicle rearward direction from the open portion. Consequently, the airflow that is discharged from the engine compartment to the wheel well can be guided in the vehicle rearward direction by a simple configuration.

A vehicle front portion structure pertaining to a third aspect includes the second aspect, and furthermore, a plurality of the guides are formed at the inner wall and are placed next to each other in a vehicle forward and rearward direction, and an open portion of one guide at a vehicle front side, among the guides adjacent to each other in the vehicle forward and rearward direction, is placed so as to reach further toward a vehicle width direction outer side than another guide located at a vehicle rear side.

In the vehicle front portion structure pertaining to the third aspect, the plural guides are placed next to each other in the vehicle forward and rearward direction. For this reason, the airflow that has been discharged from the open portion that opens at the rear end portion of the one guide placed at the vehicle front side, among the guides adjacent to each other in the vehicle forward and rearward direction, flows in the vehicle rearward direction along a vehicle width direction outer surface of the other guide placed at the vehicle rear side due to the Coanda effect. Consequently, the effect of guiding the airflow that is discharged from the engine compartment to the wheel well can be enhanced even more.

A vehicle front portion structure pertaining to a fourth aspect includes the first aspect, and furthermore, the guide is inclined outward in the vehicle width direction and in the vehicle rearward direction as seen in a plan view, and the open portion opens outward in the vehicle width direction or in the vehicle rearward direction at s vehicle front side of the guide.

In the vehicle front portion structure pertaining to the fourth aspect, the guide is inclined outward in the vehicle width direction and in the vehicle rearward direction as seen in a plan view, and the open portion opens outward in the vehicle width direction or in the vehicle rearward direction at the vehicle front side of the guide. Because of this, the airflow after being discharged from the open portion to the wheel well flows in the vehicle rearward direction along a vehicle width direction outer surface of the guide due to the Coanda effect, so the airflow can be altered to a flow in the vehicle rearward direction. Consequently, the airflow that has been discharged from the engine compartment to the wheel well can be guided in the vehicle rearward direction by a simple configuration.

A vehicle front portion structure pertaining to a fifth aspect is any one aspect of the first aspect to the fourth aspect, and furthermore, the guide is curved so as to become convex outward in the vehicle width direction and in a vehicle forward direction as seen in a plan view.

In the vehicle front portion structure pertaining to the fifth aspect, a propulsive force with respect to the traveling of the vehicle can be generated. That is, the guide is curved so as to become convex outward in the vehicle width direction and in the vehicle forward direction as seen in a plan view, so when the airflow flows in the vehicle rearward direction along the guide, a force heading outward in the vehicle width direction and in the vehicle forward direction is generated by the streamline curvature theorem. Additionally, vehicle width direction component of the force acts in the vehicle rightward direction at the guide of the wheel well placed on the vehicle right side and acts in the vehicle leftward direction at the guide of the wheel well placed at the vehicle left side, so these components are cancelled out by each other. At the same time, the vehicle forward and rearward direction component of the force acts in the vehicle forward direction in the guides of the right and left wheel wells, so these components act as a propulsive force with respect to the traveling of the vehicle. As a result, the traveling performance of the vehicle can be improved by the propulsive force.

A vehicle front portion structure pertaining to a sixth aspect is any one aspect of the first aspect to the fifth aspect, and furthermore, a lower arm of a front suspension or a tie rod is configured to be placed in the open portion.

In the vehicle front portion structure pertaining to the sixth aspect, the lower arm of the front suspension or the tie rod is placed in the open portion, so the open portion can be advantageously utilized to place the lower arm or the tie rod therein.

A vehicle front portion structure pertaining to a seventh aspect is any one aspect of the first aspect to the sixth aspect, further includes an under cover that is configured to cover the engine compartment from a vehicle lower side. A vehicle width direction outer end portion of the under cover is bent in a vehicle upward direction to configure the inner wall.

In the vehicle front portion structure pertaining to the seventh aspect, the inner wall is configured by the vehicle width direction outer end portion of the under cover, so the guide is formed in the vehicle width direction outer end portion of the under cover. Because of this, the guide can be disposed at the wheel well while controlling an increase in the number of parts.

Advantageous Effects of Invention

According to the vehicle front portion structure of the first aspect, the occurrence of air turbulence at the sides of the vehicle can be controlled.

According to the vehicle front portion structure of the second aspect, the airflow that is discharged from the engine compartment to the wheel well can be guided in the vehicle rearward direction by a simple configuration.

According to the vehicle front portion structure of the third aspect, the effect of guiding the airflow that is discharged from the engine compartment to the wheel well can be enhanced even more.

According to the vehicle front portion structure of the fourth aspect, the airflow that has been discharged from the engine compartment to the wheel well can be guided in the vehicle rearward direction by a simple configuration.

According to the vehicle front portion structure of the fifth aspect, the traveling performance of the vehicle can be improved.

According to the vehicle front portion structure of the sixth aspect, the open portion can be advantageously utilized to place the lower arm or the tie rod therein.

According to the vehicle front portion structure of the seventh aspect, the guide can be disposed at the wheel well while controlling an increase in the number of parts.

DESCRIPTION OF EMBODIMENTS

First Embodiment

A vehicle front portion structure S1 pertaining to a first embodiment will be described below using FIG. 1 to FIG. 5. It should be noted that in the drawings arrow FR indicates a forward direction of a vehicle (automobile) V to which the vehicle front portion structure S1 has been applied, arrow UP indicates a vehicle upward direction, and arrow RH indicates a vehicle rightward direction (one side in a vehicle width direction) when seen from a vehicle upper side. Furthermore, the vehicle front portion structure S1 is configured to be bilaterally symmetrical in the vehicle width direction, so the vehicle front portion structure S1 on a vehicle right side will be described and description regarding the vehicle front portion structure S1 on a vehicle left side will be omitted.

Figure 1:
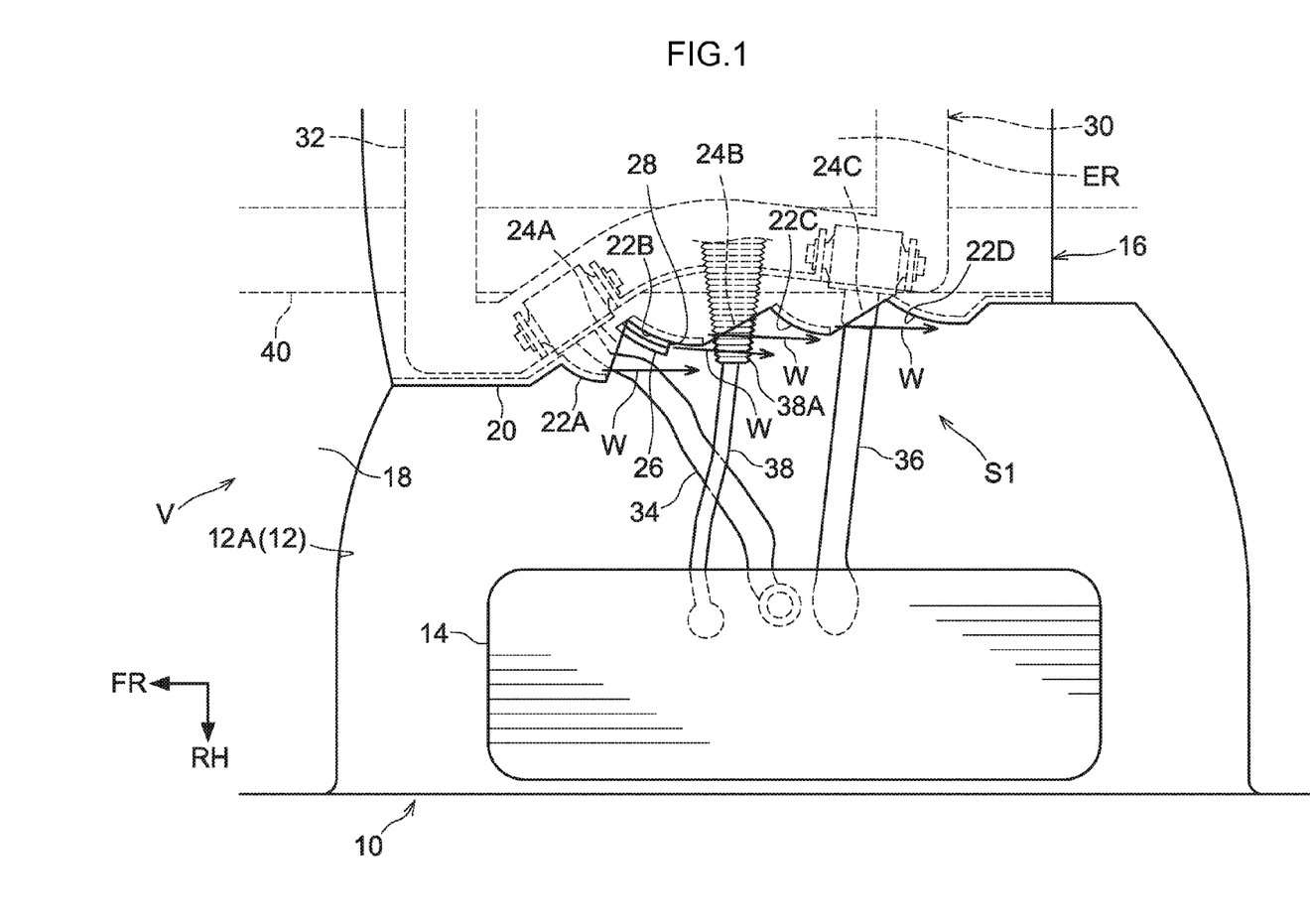
FIG. 1 is a bottom view (an enlarged view of part A of FIG. 4), seen from a vehicle lower side, showing a wheel well placed at a vehicle right side of a vehicle front portion to which a vehicle front portion structure pertaining to a first embodiment has been applied.
Figure 2:
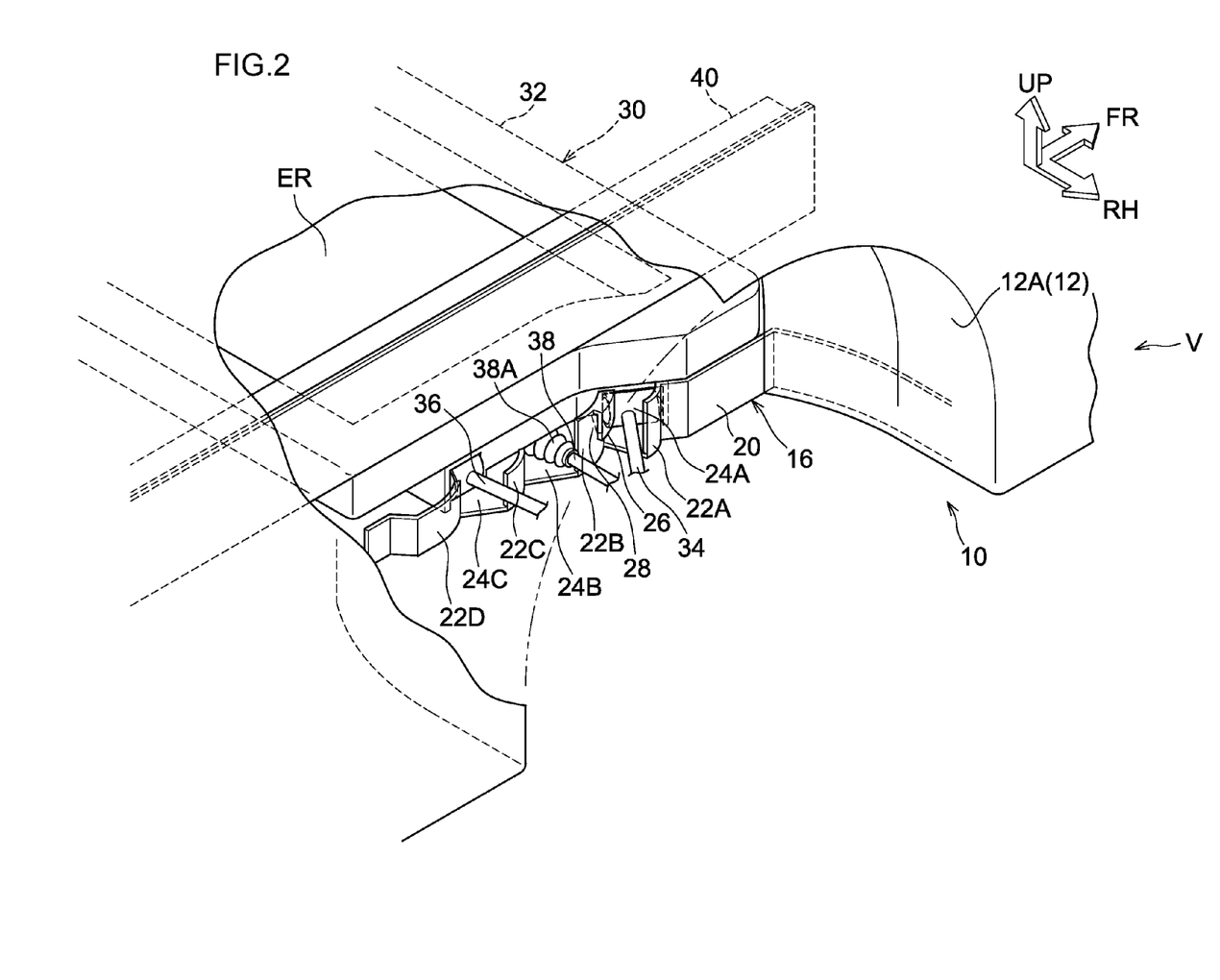
FIG. 2 is a perspective view, seen obliquely from the vehicle right side and rear side, of the wheel well shown in FIG. 1.

As shown in FIG. 1 and FIG. 2, the vehicle front portion structure S1 is applied to a wheel well 10 in a front portion of the vehicle V. Inside the wheel well 10 is disposed a fender liner 12 configured by a resin material, for example. The fender liner 12 has an arch portion 12A, and the arch portion 12A is formed in a substantially half cylinder shape that opens in a vehicle downward direction as seen in a side view. Additionally, a front tire 14 (see FIG. 1) serving as a "front wheel" is placed on a radial direction inner side of the arch portion 12A, and the arch portion 12A covers the front tire 14 from a vehicle upper side so as to allow the front tire 14 to turn.

Figure 4:
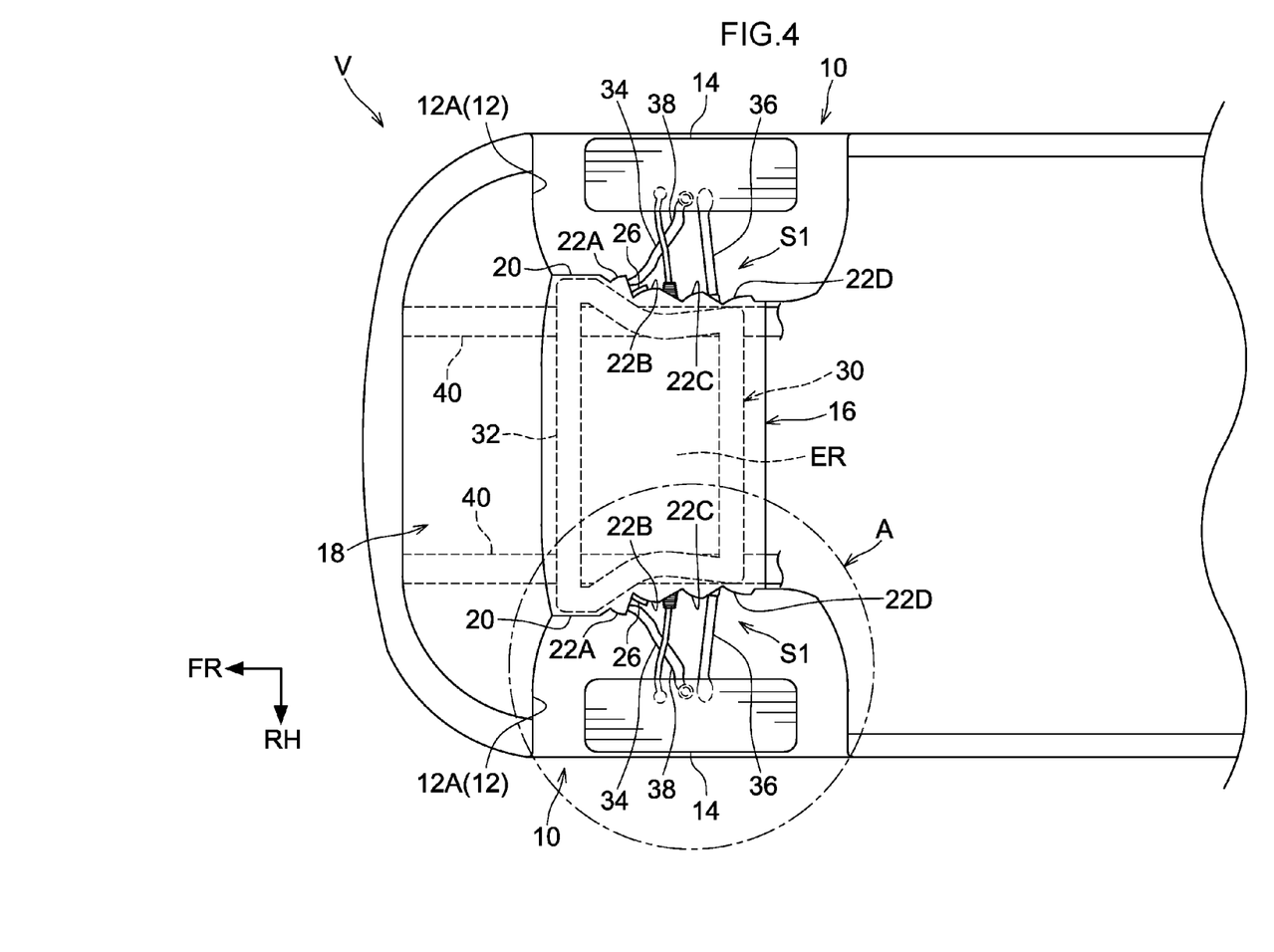
FIG. 4 is a bottom view, seen from the vehicle lower side, showing the front portion of the vehicle to which the vehicle front portion structure pertaining to the first embodiment has been applied.

Furthermore, as shown in FIG. 4, a first under cover 16 (an element to be broadly understood as an "under cover") is disposed between the right and left wheel wells 10, and the first under cover 16 covers an engine compartment ER of the vehicle V from a vehicle lower side. A second under cover 18 (an element to be broadly understood as an "under cover") is disposed at a vehicle front side of the first under cover 16, and the second under cover 18 configures a lower portion of a front end portion of the vehicle V.

Figure 3:
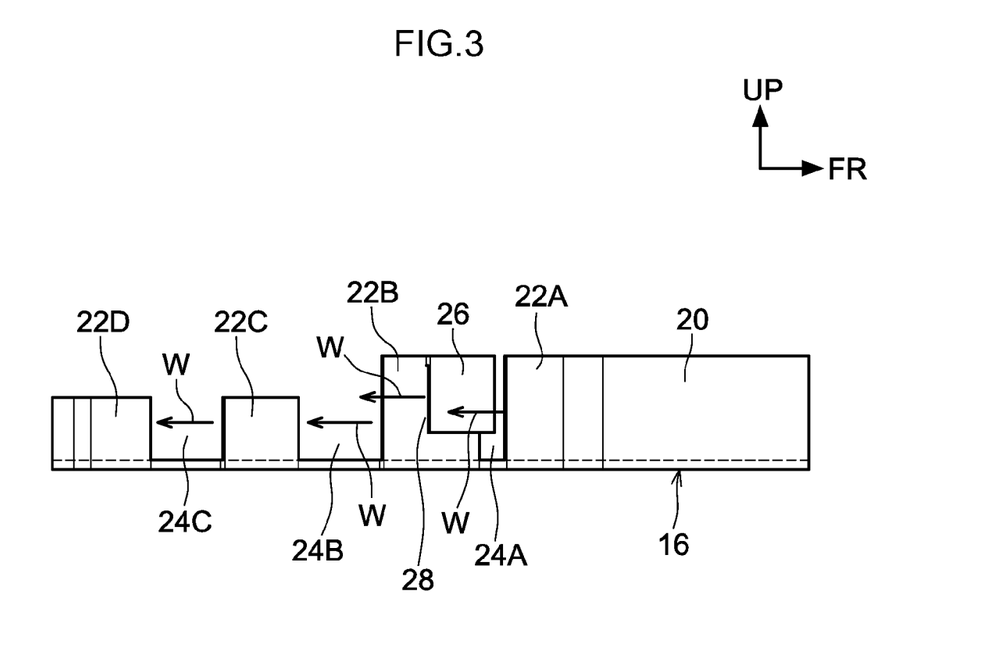
FIG. 3 is a side view, seen from the vehicle right side, of a first under cover shown in FIG. 1.

As shown in FIG. 1 to FIG. 3, vehicle width direction outer end portions of the first under cover 16 are bent in the vehicle upward direction. Additionally, each bent section is a lower inner wall portion 20 serving as an "inner wall" that configures an inner wall of the lower portion of each wheel well 10, and the lower inner wall portion 20 is placed at a vehicle width direction inner side of the front tire 14. Because of this, the inside of the wheel well 10 and an inside of the engine compartment ER are partitioned from each other in the vehicle width direction at a lower portion of the wheel well 10 by the lower inner wall portion 20 of the first under cover 16.

First guides 22A, 22B, 22C, and 22D are integrally formed at the lower inner wall portion 20 as plural (four in the present embodiment) "guides." The first guides 22A to 22D are placed next to each other with a predetermined interval interposed in the vehicle forward and rearward direction. The first guide 22A placed frontmost in the vehicle forward direction is placed at further outer side in the vehicle width direction than the other first guides 22B to 22D (see FIG. 1). Furthermore, the first guides 22A to 22D are inclined outward in the vehicle width direction and in the vehicle rearward direction as seen in a plan view, and lower ends of the first guides 22A to 22D are joined to the first under cover 16. Furthermore, a front end of the first guide 22A placed frontmost in the vehicle forward direction is joined to the lower inner wall portion 20, and a rear end portion of the first guide 22D placed rearmost in the vehicle rearward direction is bent inward in the vehicle width direction and is joined to the lower inner wall portion 20.

Because of this, first open portions 24A, 24B, and 24C respectively serving as an "open portion" that opens toward the vehicle rearward direction are formed at the rear end portion of the first guide 22A, 22B, and 22C, and the inside of the engine compartment ER and the inside of the wheel well 10 are communicated with each other by the first open portions 24A to 24C. In other words, the first open portions 24A, 24B, and 24C are placed adjacent to vehicle front sides of the first guide 22B, 22C, and 22D. Furthermore, as mentioned above, the first guide 22A placed frontmost in the vehicle forward direction among the first guides 22A to 22D is placed at the vehicle width direction further outer side than the other first guides 22B to 22D (see FIG. 1). Specifically, the first open portion of the first guide at the vehicle front side among the first guides, that are adjacent to each other in the vehicle forward and rearward direction, is placed so as to reach a further outer position in the vehicle width direction than another first guide on the vehicle rear side. That is, the first open portion 24A is placed so as to reach further outer side in the vehicle width direction than the first guide 22B, the first open portion 24B is placed so as to reach further outer side in the vehicle width direction than the first guide 22C, and the first open portion 24C is placed so as to reach further outer side in the vehicle width direction than the first guide 22D.

Furthermore, the first guides 22A to 22D are each curved so as to become convex outward in the vehicle width direction and in the vehicle forward direction as seen in a plan view. Specifically, the first guides 22A to 22D are each curved in a curvilinear shape (a substantially circular arc shape) as seen in a plan view. Because of this, in the present embodiment the vehicle width direction outer surface and the vehicle width direction inner surface of each of the first guides 22A to 22D are configured by the same curved surfaces.

Moreover, a second guide 26 serving as a "guide" is integrally formed at a vehicle front section of the first guide 22B placed second from the vehicle front side. The second guide 26 is placed at a vehicle width direction outer side of the first guide 22B and is curved in a curvilinear shape (a substantially circular arc shape) so as to form a concentric circle with the first guide 22B as seen in a plan view. Because of this, the vehicle width direction outer surface and the vehicle width direction inner surface of the second guide 26 are also configured by the same curved surfaces. Additionally, the upper end portion of the second guide 26 is bent inward in the vehicle width direction and is joined to an upper end of the first guide 22B. Because of this, a second open portion 28 serving as an "open portion" that opens toward the vehicle rearward direction is formed at a rear end portion of the second guide 26, and the inside of the engine compartment ER and the inside of the wheel well 10 are communicated with each other also by the second open portion 28.

As shown in FIG. 1 and FIG. 2, a so-called multi-link type front suspension 30 is disposed at a vehicle upper side of the first under cover 16. The front suspension 30 has a suspension member 32 (see FIG. 4) formed in a substantially rectangular frame shape as seen in a plan view. Furthermore, a right and left pair of front side members 40, that configure skeletal members of the vehicle V, extend in the vehicle forward and rearward direction at a vehicle upper side of both vehicle width direction end sections of the suspension member 32. Additionally both vehicle width direction end sections of the suspension member 32 are secured to the front side members 40. It should be noted that a power unit not shown in the drawings is placed between the right and left pair of front side members 40.

Furthermore, a first lower arm 34 serving as a "lower arm" that configures the front suspension 30 is placed at a vehicle lower side of the suspension member 32, and a base end portion of the first lower arm 34 is rotatably supported at the suspension member 32. A portion at the base end side of the first lower arm 34 is placed inside the first open portion 24A, and the first lower arm 34 is inclined in the vehicle rearward direction heading outward in the vehicle width direction as seen in a plan view and extends outward in the vehicle width direction (into the wheel well 10) from the first open portion 24A. Because of this, at the first open portion 24A, the first guide 22A is placed at the vehicle front side of the first lower arm 34 and the second guide 26 is placed at the vehicle rear side of the first lower arm 34.

Furthermore, a second lower arm 36 serving as a "lower arm" that configures the front suspension 30 is placed at the vehicle lower side of the suspension member 32 and at a vehicle rear side of the first lower arm 34, and a base end portion of the second lower arm 36 is rotatably supported at the suspension member 32. A portion at the base end side of the second lower arm 36 is placed inside the first open portion 24C, and the second lower arm 36 extends outward in the vehicle width direction (into the wheel well 10) from the first open portion 24C. Because of this, at the first open portion 24C, the first guide 22C is placed at the vehicle front side of the second lower arm 36 and the first guide 22D is placed at the vehicle rear side of the second lower arm 36.

Moreover, a steering box (not shown in the drawings) extends in the vehicle width direction at a vehicle lower side of the suspension member 32, and a tie rod 38 is coupled to both vehicle width direction end portions of the steering box. A portion of the tie rod 38 coupled to the steering box is covered by a boot 38A. Additionally, the boot 38A is placed inside the first open portion 24B, and the tie rod 38 extends outward in the vehicle width direction (into the wheel well 10) from the first open portion 24B. Because of this, at the first open portion 24B, the first guide 22B is placed at the vehicle front side of the tie rod 38 and the first guide 22C is placed at the vehicle rear side of the tie rod 38.

Next, the action and effects of the first embodiment will be described.

In the vehicle front portion structure S1 configured as described above, both vehicle width direction end portions of the first under cover 16, that covers the engine compartment ER from the vehicle lower side, are bent in the vehicle upward direction to form the lower inner wall portion 20 that configures part of the wheel well 10. The lower inner wall portion 20 is placed at the vehicle width direction inner side of the front tire 14 and partitions the inside of the engine compartment ER and the inside of the wheel well 10 from each other.

The four first guides 22A to 22D are formed at the lower inner wall portion 20. The first guides 22A to 22D are inclined outward in the vehicle width direction and in the vehicle rearward direction as seen in a plan view. Furthermore, the first open portions 24A, 24B, and 24C that open toward the vehicle rearward direction are formed at the respective rear end portions of the first guide 22A, 22B, and 22C, and the inside of the engine compartment ER and the inside of the wheel well 10 are communicated with each other by the first open portions 24A to 24C.

For this reason, when the vehicle V travels, air flows into the engine compartment from a front grille or the like at the front end portion of the vehicle V, and the air inside the engine compartment ER is discharged from the first open portions 24A to 24C into the wheel well 10. Additionally, as shown schematically in FIG. 5, airflows W that become discharged into the wheel well 10 flow along the vehicle width direction inner surfaces of the first guides 22A to 22C, so the airflows W are altered to flows in the vehicle rearward direction by the first guides 22A to 22C. For this reason, the airflows W that have been altered to flows in the vehicle rearward direction are discharged in the vehicle rearward direction from the first open portions 24A to 24C (see FIG. 1 and FIG. 3). Because of this, the airflows W flow inside the wheel well 10 in the vehicle rearward direction. Additionally, the airflows W flow from the rear end of the wheel well 10 toward an under side of the floor of the vehicle V and flow in the vehicle rearward direction. Consequently, the airflows W are restrained from being blown outward in the vehicle width direction from the wheel well 10. As a result, the airflows W are restrained from colliding with the traveling wind flowing along the sides of the vehicle V in the vehicle rearward direction, so the occurrence of air turbulence on the sides of the vehicle V can be controlled.

The above action will be described in detail below. From the standpoint of restraining the airflows W from rushing outward in the vehicle width direction from the wheel wells 10, restricting the air inside the engine compartment ER from being discharged into the wheel wells 10 is preferred. That is to say, by omitting the first open portions 24A to 24C at the lower inner wall portion 20, the airflows W can be restricted from being discharged (flowing) from the inside of the engine compartment ER into the wheel well 10. However, in this case, it becomes easier for the air inside the engine compartment ER to remain there, so there is the concern that the power unit in the engine compartment ER may not be sufficiently cooled. For this reason, by forming the first open portions 24A to 24C at the lower inner wall portion 20 of the wheel well 10, the air inside the engine compartment ER can be discharged from the first open portions 24A to 24C to enhance the cooling of the power unit in the engine compartment ER.

On the other hand, if the first guides 22A to 22D were to be omitted at the wheel well 10 having the first open portions 24A to 24C formed at the lower inner wall portion 20, the airflows W would be discharged outward in the vehicle width direction from the first open portions 24A to 24C into the wheel well 10. For this reason, there is the concern that the airflows W that have been discharged into the wheel well 10 would be blown outward in the vehicle width direction from the wheel well 10 and collide with the traveling wind flowing along the sides of the vehicle V in the vehicle rearward direction. Because of this, there is the potential for air turbulence to occur at the sides of the vehicle V, leading to an increase in the air resistance and a drop in the maneuverability of the vehicle V.

To address this, in the first embodiment the first guides 22A to 22D are formed at the lower inner wall portion 20, so, as mentioned above, the airflows W that have been discharged from the first open portions 24A to 24C into the wheel well 10 flow in the vehicle rearward direction. Because of this, the airflows W are restrained from rushing outward in the vehicle width direction from the wheel well 10, and the occurrence of air turbulence due to the airflows W rushing out from the wheel well 10 can be restrained. Consequently, according to the vehicle front portion structure S1 of the present embodiment, the occurrence of air turbulence at the sides of the vehicle V can be controlled while enhancing the effect of cooling the power unit in the engine compartment ER, and therefore an increase in the air resistance and a drop in the maneuverability of the vehicle V can be controlled.

Figure 5:
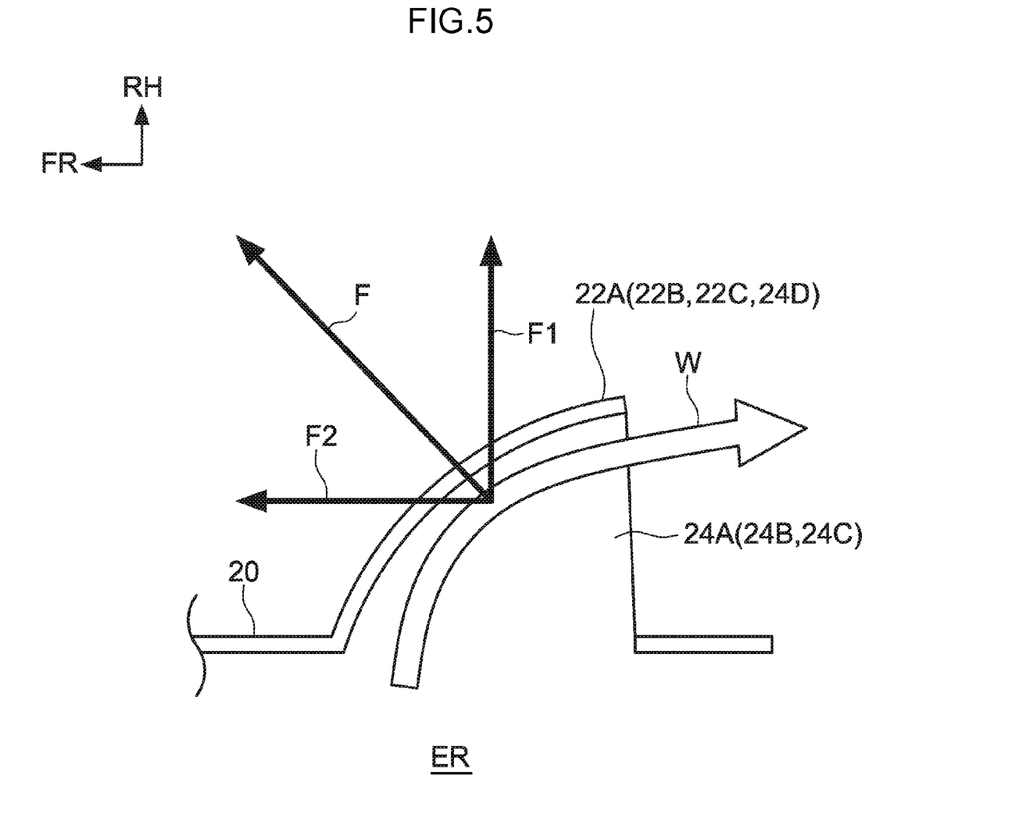
FIG. 5 is an explanatory view, seen from the vehicle upper side, for describing the flow of an airflow and a force acting on a first guide because of the airflow in the first embodiment.

Furthermore, the first guides 22A to 22D are each curved so as to become convex outward in the vehicle width direction and in the vehicle forward direction as seen in a plan view. For this reason, as shown in FIG. 5, when the airflows W flow in the vehicle rearward direction along the vehicle width direction inner surfaces of the first guides 22A to 22C, the airflows W become bent in a curved shape in the vehicle rearward direction by the first guides 22A to 22D. Because of this, due to the streamline curvature theorem, the radial direction inward pressure of each airflow W that has been bent in a curved shape becomes lower, and the radial direction outward pressure of each airflow W that has been bent in a curved shape becomes higher. As a result, a force F heading outward in the vehicle width direction and in the vehicle forward direction is produced by each airflow W that has been bent in a curved shape, and the force F acts in such a way as to push against the vehicle width direction inner surfaces of the first guides 22A to 22D.

Additionally, in the first guides 22A to 22D of the wheel well 10 placed on the vehicle right side, a vehicle width direction component F1 of the force F produced by each airflow W acts in the vehicle rightward direction, and a vehicle forward and rearward direction component F2 of the force F acts in the vehicle forward direction. At the same time, in the first guides 22A to 22D of the wheel well 10 placed on the vehicle left side, the vehicle width direction component F1 of the force F produced by each airflow W acts in the vehicle leftward direction, and the vehicle forward and rearward direction component F2 of the force F acts in the vehicle forward direction. For this reason, the components F1 are cancelled out by each other in the right and left wheel wells 10. Meanwhile, the components F2 act in the vehicle forward direction in the right and left wheel wells 10. Because of this, the components F2 act as a propulsive force with respect to the traveling of the vehicle V. As a result, the traveling performance of the vehicle V can be improved by the propulsive forces.

Furthermore, the first lower arm 34 is placed inside the first open portion 24A, the tie rod 38 is placed inside the first open portion 24B, and the second lower arm 36 is placed inside the first open portion 24C. For this reason, the first open portions 24A to 24C can be advantageously utilized to place the first lower arm 34, the tie rod 38, and the second lower arm 36 therein. In other words, the first open portions 24A to 24C are formed in order to place the first lower arm 34, the tie rod 38, and the second lower arm 36 therein, and the first open portions 24A to 24C can be advantageously utilized to cause the airflows W that become discharged from the first open portions 24A to 24C to flow in the vehicle rearward direction.

Furthermore, the first guides 22A to 22D are placed apart from and next to each other with predetermined intervals in the vehicle forward and rearward direction, and the first open portion 24A, 24B, and 24C are each placed adjacent to the vehicle front side of the first guide 22B, 22C, and 22D. For this reason, the airflows W that has been discharged from the first open portion 24A, 24B, and 24C flow in the vehicle rearward direction along the vehicle width direction outer surfaces of the first guide 22B, 22C, and 22D due to the Coanda effect. Consequently, by placing the first guides 22A to 22D next to each other in the vehicle forward and rearward direction, the effect of guiding the airflows W can be enhanced even more.

Furthermore, the second guide 26 is integrally disposed at the vehicle front side section of the first guide 22B, and the second guide 26 is placed on the vehicle rear side of the first lower arm 34. For this reason, at the vehicle front side of the first lower arm 34 the airflow W can be altered to a flow in the vehicle rearward direction by the first guide 22A, and this airflow W can be discharged in the vehicle rearward direction from the first open portion 24A. Furthermore, at the vehicle rear side of the first lower arm 34 the airflow W can be altered to a flow in the vehicle rearward direction by the second guide 26, and this airflow W can be discharged in the vehicle rearward direction from the second open portion 28 (see FIG. 1). Because of this, around the periphery of the base end portion of the first lower arm 34 the airflows W can be effectively caused to flow in the vehicle rearward direction.

Moreover, both vehicle width direction end portions of the first under cover 16 configure the lower inner wall portion 20 of each wheel well 10, and the first guides 22A to 22D and the second guide 26 are formed at each lower inner wall portion 20. Because of this, the first guides 22A to 22D and the second guide 26 can be disposed in each wheel well 10 while controlling an increase in the number of parts.

Second Embodiment

Figure 6:
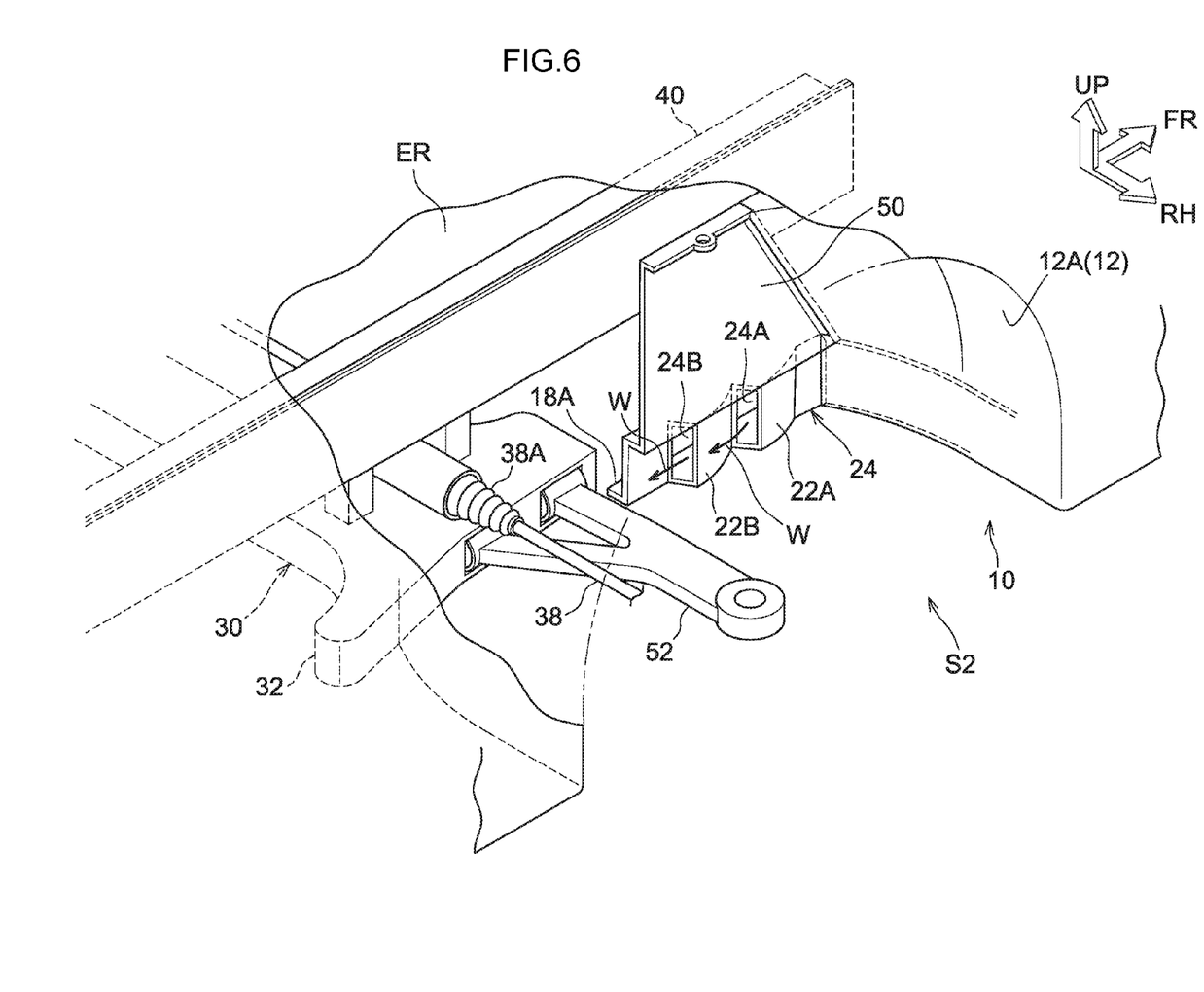
FIG. 6 is a perspective view, seen obliquely from the vehicle right side and rear side, showing a wheel well placed at a vehicle right side of a vehicle front portion to which a vehicle front portion structure pertaining to a second embodiment has been applied.
Figure 7:
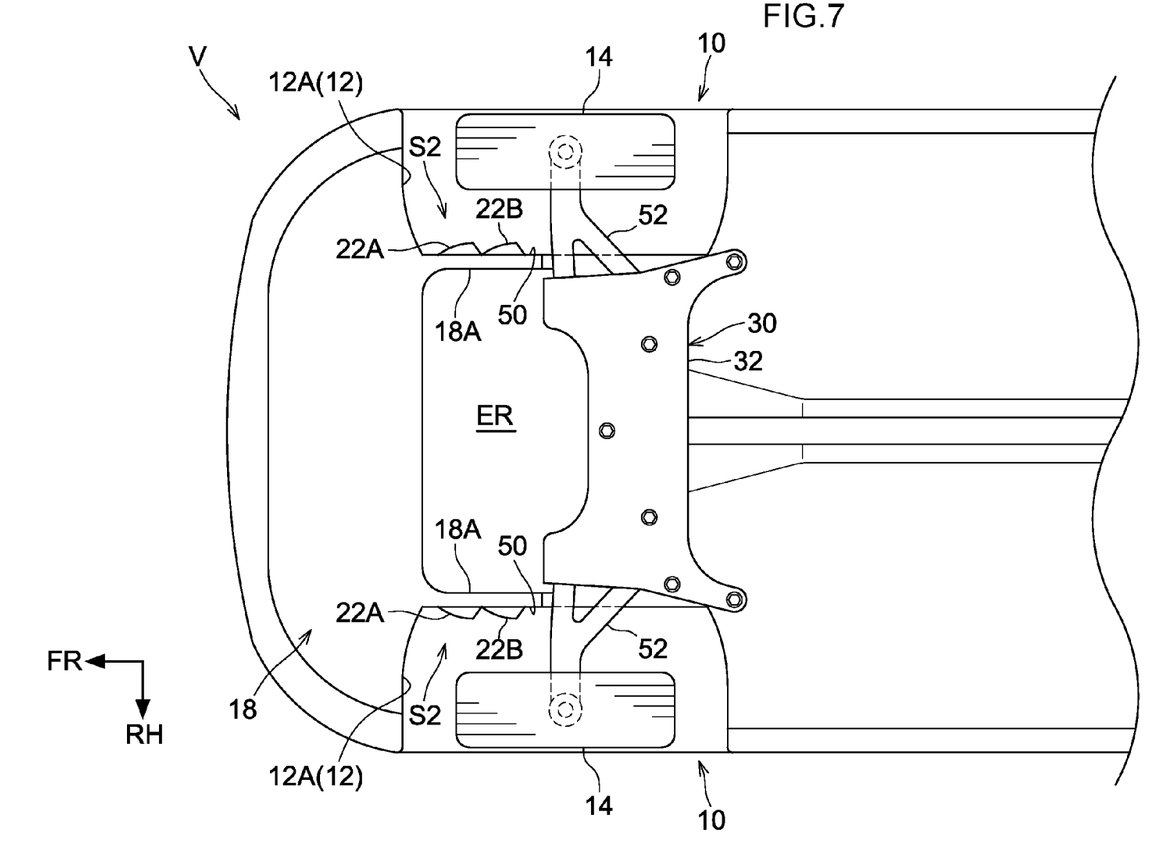
FIG. 7 is a bottom view, seen from the vehicle lower side, showing the front portion of the vehicle to which the vehicle front portion structure pertaining to the second embodiment has been applied.

A vehicle front portion structure S2 of a second embodiment will be described below using FIG. 6 and FIG. 7. As shown in FIG. 7, in the second embodiment the first under cover 16 is omitted in the vehicle V. Furthermore, extension portions 18A that extend in the vehicle rearward direction are integrally formed at both vehicle width direction sections of the second under cover 18, and the extension portions 18A are placed at vehicle width direction inner sides of the wheel wells 10. Moreover, as shown in FIG. 6, a vehicle width direction outer end portion of each extension portion 18A is bent in the vehicle upward direction, and each bent section is a front inner wall portion 50 serving as an "inner wall" that configures the front portion of the inner wall of each wheel well 10. Additionally, the front inner wall portions 50 are placed at vehicle width direction inner sides of the front tires 14 (see FIG. 7).

Furthermore, a vertical direction middle portion of each front inner wall portion 50 is bent in a substantially crankshaft shape as seen in a front view, and a lower portion of the front inner wall portion 50 is placed at a vehicle width direction further inner side than an upper portion of the front inner wall portion 50. Additionally, in the second embodiment two first guides are formed at the lower portion of each front inner wall portion 50. That is, first guides 22A and 22B are formed in each front inner wall portion 50, and the first guides 22A and 22B project outward in the vehicle width direction from the front inner wall portion 50 and are placed next to each other in the vehicle forward and rearward direction. Furthermore, the upper end portions and the lower end portions of the first guides 22A and 22B are bent inward in the vehicle width direction and are joined to the front inner wall portion 50. Because of this, first open portions 24A and 24B that open toward the vehicle rearward direction are formed at the rear end portions of the first guide 22A and 22B. Furthermore, in the second embodiment the second guide 26 of the first embodiment is omitted.

Moreover, in the second embodiment the front suspension 30 is a so-called strut type suspension, and a lower arm 52 that configures the front suspension 30 is formed in a substantially γ shape that opens inward in the vehicle width direction as seen in a plan view. The lower arm 52 and the tie rod 38 are placed at the vehicle rear side of the front inner wall portion 50.

Additionally, when the vehicle V travels, the air inside the engine compartment ER is drawn toward the wheel well 10, and airflows W flowing toward the wheel well 10 are produced. The airflows W, like in the first embodiment, flow along the vehicle width direction inner surfaces of the first guides 22A and 22B and are altered to flows in the vehicle rearward direction. Additionally, the airflows W that have been altered to flows in the vehicle rearward direction are discharged in the vehicle rearward direction from the first open portions 24A and 24B (see FIG. 6). Because of this, the airflows W flow inside the wheel well 10 in the vehicle rearward direction. Additionally, the airflows W flow from the rear portion of the wheel well 10 toward an under portion of the floor of the vehicle V and flow in the vehicle rearward direction. Consequently, the airflows W are restrained from being blown outward in the vehicle width direction from the wheel well 10. As a result, the occurrence of air turbulence due to the airflows W rushing out from the wheel well 10 is controlled. Because of this, in the second embodiment also, the same action and effects as those in the first embodiment can be achieved.

It should be noted that although in the first embodiment and in the second embodiment, the first guides 22A to 22D (the first guides 22A and 22B in the second embodiment) are each curved in a curvilinear shape so as to become convex outward in the vehicle width direction and in the vehicle forward direction as seen in a plan view, the shape of the first guides 22A to 22D is not limited to this. For example, to describe using the first guide 22A, the first guide 22A may also be divided into flat plate-shaped plural guide portions, and by connecting the guide portions to each other, the first guide 22A may be curved so as to become convex outward in the vehicle width direction and in the vehicle forward direction. That is, the vehicle width direction outer surface and the vehicle width direction inner surface of the first guide 22A may also be set to be configured by plural flat surfaces. Because of this, the statement "the guide is curved so as to become convex in the vehicle forward direction and outward in the vehicle width direction" in the present embodiments includes a case where the vehicle width direction outer surface and the vehicle width direction inner surface of each of the first guides 22A to 22D are configured by a single curved surface and a case where the vehicle width direction outer surface and the vehicle width direction inner surface of each of the first guides 22A to 22D are configured by plural flat surfaces.

Furthermore, in the first embodiment and in the second embodiment, the first open portions 24A, 24B, and 24C that open toward the vehicle rearward direction is formed at the rear end portion of the first guide portions 22A, 22B, and 22C, but the open direction and the position of the first open portion 24A, 24B, and 24C may also be set as follows. That is, to describe by way of FIG. 8 using the first open portion 24A and the first guide 22A, for example, the first open portion 24A that opens outward in the vehicle width direction may also be formed at a vehicle front side of the first guide 22A. In this case, the airflow W is discharged outward in the vehicle width direction from the first open portion 24A into the wheel well 10, but the airflow W flows in the vehicle rearward direction along a vehicle width direction outer surface of the first guide 22A due to the Coanda effect, so the airflow W is altered to a flow in the vehicle rearward direction. For this reason, even in a case where the first open portion 24A that opens outward in the vehicle width direction is formed at the vehicle front side of the first guide 22A, the airflow W that has been discharged from the first open portion 24A into the wheel well 10 flows in the vehicle rearward direction, so the airflow W can be restrained from being blown outward in the vehicle width direction from the wheel well 10.

Figure 8:
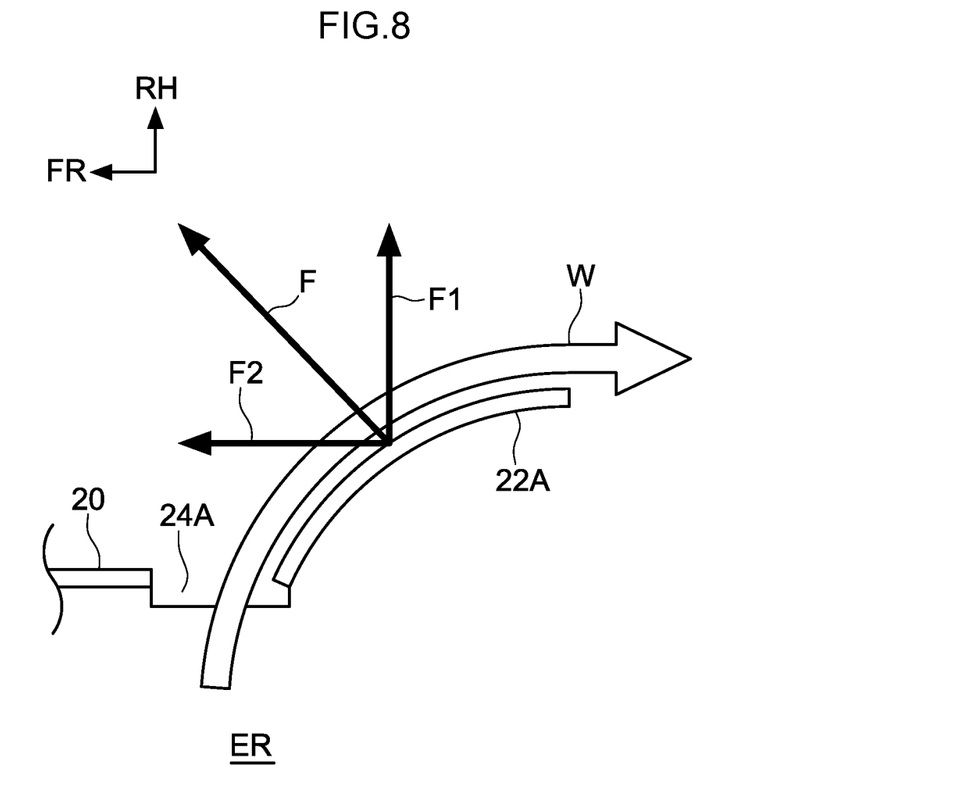
FIG. 8 is an explanatory view, seen from the vehicle upper side, for describing the flow of an airflow and a force acting on a first guide because of the airflow in a modified example of a first open portion.

Moreover, also in a case where the first open portion 24A is formed at the vehicle front side of the first guide 22A, a propulsive force with respect to the traveling of the vehicle V can be produced by the airflow W. That is, as shown in FIG. 8, when the airflow W flows in the vehicle rearward direction along the vehicle width direction outer surface of the first guide 22A, the airflow W becomes bent in a curved shape in the vehicle rearward direction by the first guide 22A. For this reason, as mentioned above, due to the streamline curvature theorem, a force F heading outward in the vehicle width direction and in the vehicle forward direction is produced by the airflow W that has been bent in a curved shape, and the force F acts so as to pull the first guide 22A. Additionally, the vehicle width direction components F1 of each force F are cancelled out by each other at the first guides 22A of the right and left wheel wells 10. Meanwhile, the vehicle forward and rearward direction components F2 of each force F act in the vehicle forward direction at the first guides 22A of the right and left wheel wells 10. Consequently, the components F2 act as a propulsive force with respect to the traveling of the vehicle V. As a result, in this case also, the traveling performance of the vehicle V can be improved.

Furthermore, in the first embodiment the first guides 22A to 22D and the second guide 26 are integrally formed with the first under cover 16, and in the second embodiment the first guides 22A and 22B are integrally formed with the second under cover 18, but the members forming the first guides 22A to 22D and the second guide 26 are not limited to this. For example, the lower inner wall portion 20 may be configured separately from the first under cover 16, and the lower inner wall portion 20 may be joined to the first under cover 16. Furthermore, the front inner wall portion 50 may be configured separately from the second under cover 18, and the front inner wall portion 50 may be joined to the second under cover 18.

Furthermore, in the first embodiment the four first guides 22A to 22D are formed in the lower inner wall portion 20, and in the second embodiment the two first guides 22A and 22B are formed in the front inner wall portion 50, but the number of the first guides can be arbitrarily set.

Furthermore, in the second embodiment the first under cover 16 is omitted, but the first under cover 16 may also be attached to the vehicle V like in the first embodiment.

The invention claimed is:

1. A vehicle front portion structure comprising:
   an inner wall that configures part of a wheel well having a front wheel placed therein, the inner wall being placed at a vehicle width direction inner side of the front wheel, and the inner wall being formed with an open portion that is configured to communicate an inside of an engine compartment with an inside of the wheel well; and
   a guide that is formed at the inner wall, the guide being inclined outward in the vehicle width direction and in the vehicle rearward direction as seen in a plane view, the guide guiding, in a vehicle rearward direction, an airflow that is discharged from the open portion to the wheel well or an airflow that has been discharged from the open portion to the wheel well,
   wherein the open portion opens outward in the vehicle width direction or in the vehicle rearward direction at a vehicle front side of the guide.

2. The vehicle front portion structure according to claim 1, wherein the guide is curved so as to become convex outward in the vehicle width direction and in a vehicle forward direction as seen in a plan view.

3. The vehicle front portion structure according to claim 1, wherein a lower arm of a front suspension or a tie rod is configured to be placed in the open portion.

4. The vehicle front portion structure according to claim 1, further comprising an under cover that is configured to cover the engine compartment from a vehicle lower side, wherein a vehicle width direction outer end portion of the under cover is bent in a vehicle upward direction to configure the inner wall.

\* \* \* \* \*